(12) United States Patent  
Lee

(10) Patent No.: US 8,906,524 B2  
(45) Date of Patent: Dec. 9, 2014

(54) SECONDARY BATTERY HAVING A MODULAR FRAME TO SUPPORT A PROTECTION CIRCUIT MODULE

(75) Inventor: Sangjoo Lee, Suwon-si (KR)

(73) Assignee: Samsung SDI Co., Ltd., Gyeonggi-Do (KR)

( * ) Notice: Subject to any disclaimer, the term of this patent is extended or adjusted under 35 U.S.C. 154(b) by 730 days.

(21) Appl. No.: 12/789,788

(22) Filed: May 28, 2010

(65) Prior Publication Data

US 2011/0052938 A1   Mar. 3, 2011

(30) Foreign Application Priority Data

Sep. 1, 2009   (KR) .................. 10-2009-0082159

(51) Int. Cl.
| | |
|---|---|
| *H01M 14/00* | (2006.01) |
| *H01M 2/06* | (2006.01) |
| *H01M 2/02* | (2006.01) |
| *H01M 2/34* | (2006.01) |

(52) U.S. Cl.  
CPC .............. *H01M 2/0207* (2013.01); *H01M 2/06* (2013.01); *H01M 2200/106* (2013.01); *H01M 2/34* (2013.01)  
USPC .................. 429/7; 429/61; 429/62; 429/175; 429/178

(58) Field of Classification Search  
CPC ........... H01M 2/00; H01M 2/02; H01M 2/04; H01M 10/48  
USPC ........................... 429/121, 122, 62, 7, 175, 61  
See application file for complete search history.

(56) References Cited

U.S. PATENT DOCUMENTS

| | | | |
|---|---|---|---|
| 6,432,575 B1 * | 8/2002 | Yamagami | 429/100 |
| 7,462,417 B2 | 12/2008 | Moon | |
| 7,537,720 B2 * | 5/2009 | Moon | 264/272.21 |
| 2005/0153195 A1 * | 7/2005 | Han | 429/59 |
| 2006/0257723 A1 * | 11/2006 | Tan et al. | 429/65 |
| 2007/0154796 A1 * | 7/2007 | Uh | 429/174 |
| 2007/0298287 A1 | 12/2007 | Tajima et al. | |
| 2008/0008910 A1 * | 1/2008 | Koh | 429/7 |
| 2008/0102357 A1 * | 5/2008 | Hong et al. | 429/122 |
| 2008/0118825 A1 * | 5/2008 | Yoon | 429/122 |
| 2009/0098418 A1 | 4/2009 | Byun et al. | |
| 2009/0111013 A1 * | 4/2009 | Jang | 429/163 |
| 2009/0117412 A1 * | 5/2009 | Koh et al. | 429/7 |
| 2009/0305119 A1 * | 12/2009 | Kim | 429/93 |
| 2010/0055560 A1 * | 3/2010 | Jang et al. | 429/163 |

FOREIGN PATENT DOCUMENTS

| | | |
|---|---|---|
| JP | 2006-147193 A | 6/2006 |
| JP | 2008-010501 A | 1/2008 |
| KR | 10-0670430 B1 | 1/2007 |
| KR | 10-0721829 B1 | 5/2007 |
| KR | 10-2009-0038153 A | 4/2009 |

* cited by examiner

*Primary Examiner* — Milton I Cano  
*Assistant Examiner* — Carmen Lyles-Irving  
(74) *Attorney, Agent, or Firm* — Knobbe, Martens, Olson & Bear, LLP

(57) ABSTRACT

A secondary battery includes a module frame capable of supporting a protection circuit module in a stable manner. The secondary battery includes a bare cell including a cap plate, a protection circuit module, and a module frame provided between the cap plate and the protection circuit module to support the protection circuit module. The module frame is made of a conductive material to electrically connect the cap plate and the protection circuit module to each other.

16 Claims, 4 Drawing Sheets

150~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~~
SECONDARY BATTERY HAVING A MODULAR FRAME TO SUPPORT A PROTECTION CIRCUIT MODULE

CROSS-REFERENCE TO RELATED APPLICATIONS

This application claims the benefit of Korean Patent Application No. 10-2009-0082159 filed on Sep. 1, 2009, the contents of which are incorporated herein by reference in their entirety.

BACKGROUND

1. Field

Aspects of the invention relate to a secondary battery.

2. Description of the Related Art

In recent years, with rapid advances in the industrial fields of electronics, communications, computers, and so forth, the proliferation of portable electronic devices has been increasing. Rechargeable secondary batteries typically have been used as the power source for portable electronic devices.

In general, a secondary battery includes a bare cell including a can accommodating an electrode assembly, and a protection circuit module mounted on the bare cell to control charging and discharging of the bare cell. The protection circuit module should be mounted on the bare cell in a stable manner.

SUMMARY

Aspects of the invention relate to a secondary battery having a module frame capable of supporting a protection circuit module in a stable manner.

According to an aspect of the invention, a secondary battery includes a bare cell including a cap plate; a protection circuit module; and a module frame provided between the cap plate and the protection circuit module to support the protection circuit module; wherein the module frame is made of a conductive material to electrically connect the cap plate and the protection circuit module to each other.

According to an aspect of the invention, the bare cell includes an electrode assembly including a first electrode, a second electrode, and a separator disposed between the first electrode and the second electrode to insulate the first electrode from the second electrode; a can having an opening to accommodate the electrode assembly; and an electrode terminal electrically connected to the first electrode; wherein the cap plate seals the opening of the can, is insulated from the electrode terminal, and is electrically connected to the second electrode.

According to an aspect of the invention, the module frame is made of one or more of nickel, aluminum, and a nickel-silver composite.

According to an aspect of the invention, the module frame includes an insulating film coating all regions of the module frame except for contact regions to establish electrical connections with the cap plate and the protection circuit module.

According to an aspect of the invention, the module frame includes a rectangular bottom portion; a pair of wing portions extending from both lateral edges of the bottom portion in a first direction away from the cap plate; a pair of frame connecting portions extending from opposite ends of the bottom portion in a second direction toward the cap plate; and a pair of frame supporting portions extending from respective ones of the frame connecting portions parallel with the bottom portion.

According to an aspect of the invention, the bottom portion of the module frame includes an open region.

According to an aspect of the invention, the secondary battery further includes a secondary protection device including a first terminal, a second terminal, and a positive temperature coefficient (PTC) device; wherein the open region is a first open region for the secondary protection device and enables the first terminal of the secondary protection device and the protection circuit module to be connected to each other.

According to an aspect of the invention, the secondary battery further includes a secondary protection device including a first terminal, a second terminal, and a positive temperature coefficient (PTC) device; wherein the open region is a second open region for the secondary protection device and enables the second terminal of the secondary protection device and the electrode terminal to be connected to each other.

According to an aspect of the invention, the protection circuit module further includes a control device mounted on a first surface of the protection circuit module facing toward the cap plate; and an external terminal provided on a second surface of the protection circuit module facing away from the cap plate to connect the secondary battery to an external device; wherein the open region is an open region for the control device to accommodate the control device mounted on the first surface of the protection circuit module.

According to an aspect of the invention, the module frame further includes at least one rib extending across the open region; wherein opposite ends of each of the at least one rib are connected to respective ones of the wing portions so that each of the at least one rib extends across the open region to support the protection circuit module.

According to an aspect of the invention, the secondary battery further includes a secondary protection device including a first terminal, a second terminal, and a positive temperature coefficient (PTC) device; wherein the protection circuit module includes a control device mounted on a first surface of the protection circuit module facing toward the cap plate; and an external terminal provided on a second surface of the protection circuit module facing away from the cap plate to connect the secondary battery to an external device; and wherein the open region is a single open region including a first open region for the secondary protection device that enables the first terminal of the secondary protection device and the protection circuit module to be connected to each other; a second open region for the secondary protection device that enables the second terminal of the secondary protection device and the electrode terminal to be connected to each other; and an open region for the control device to accommodate the control device mounted on the first surface of the protection circuit module.

According to an aspect of the invention, the module frame further includes intermediate support portions extending from the bottom portion or the wing portions toward the cap plate to support the module frame.

According to an aspect of the invention, the frame supporting portions are bolted or welded to the cap plate.

According to an aspect of the invention, the frame supporting portions are laser-welded or resistance-welded to the cap plate.

According to an aspect of the invention, a secondary battery includes a bare cell including a cap plate; a module frame mounted on the cap plate; and a protection circuit module supported by the module frame; wherein the module frame is electrically conductive so that the cap plate and the protection circuit module are electrically connected to each other via the module frame.

As described above, a secondary battery according to aspects of the invention can support a protection circuit module in a stable manner.

Additional aspects and/or advantages of the invention will be set forth in part in the description that follows and, in part, will be obvious from the description, or may be learned by practice of the invention.

BRIEF DESCRIPTION OF THE DRAWINGS

The above and/or other aspects and advantages of the invention will be become apparent and more readily appreciated from the following description of the embodiments, taken in conjunction with the accompanying drawings of which.

DETAILED DESCRIPTION

Figure 1:
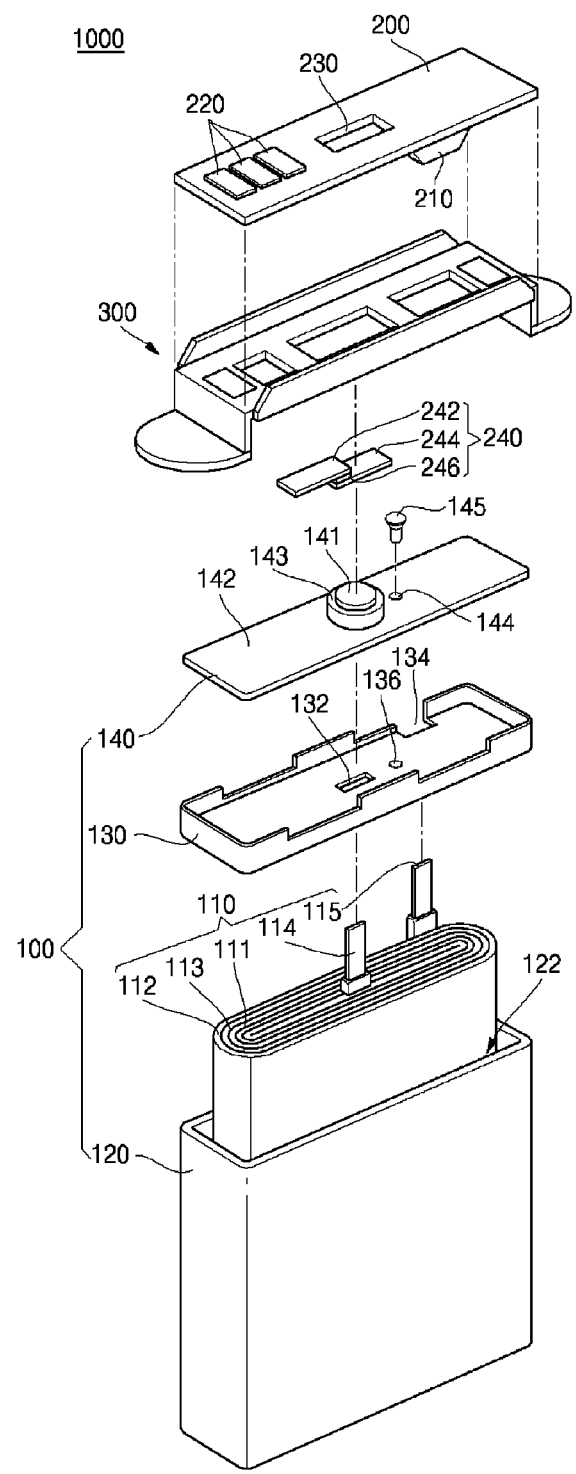
FIG. 1 is an exploded perspective view of a secondary battery according to an aspect of the invention.

Reference will now be made in detail to embodiments of the invention, examples of which are shown in the accompanying drawings, wherein like reference numerals refer to like elements throughout. The embodiments are described below in order to explain the invention by referring to the figures.

Figure 2A:
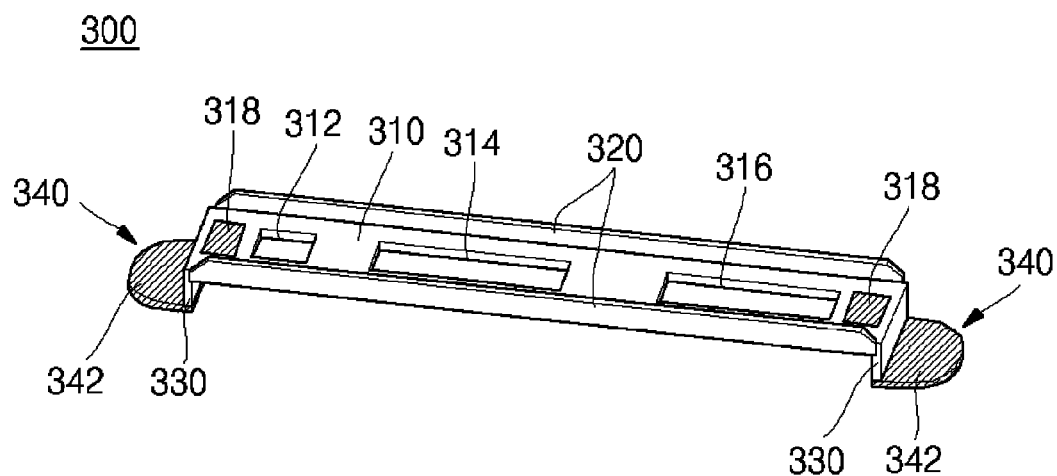
FIGS. 2A and 2B show a module frame of a secondary battery according to an aspect of the invention.
Figure 2B:
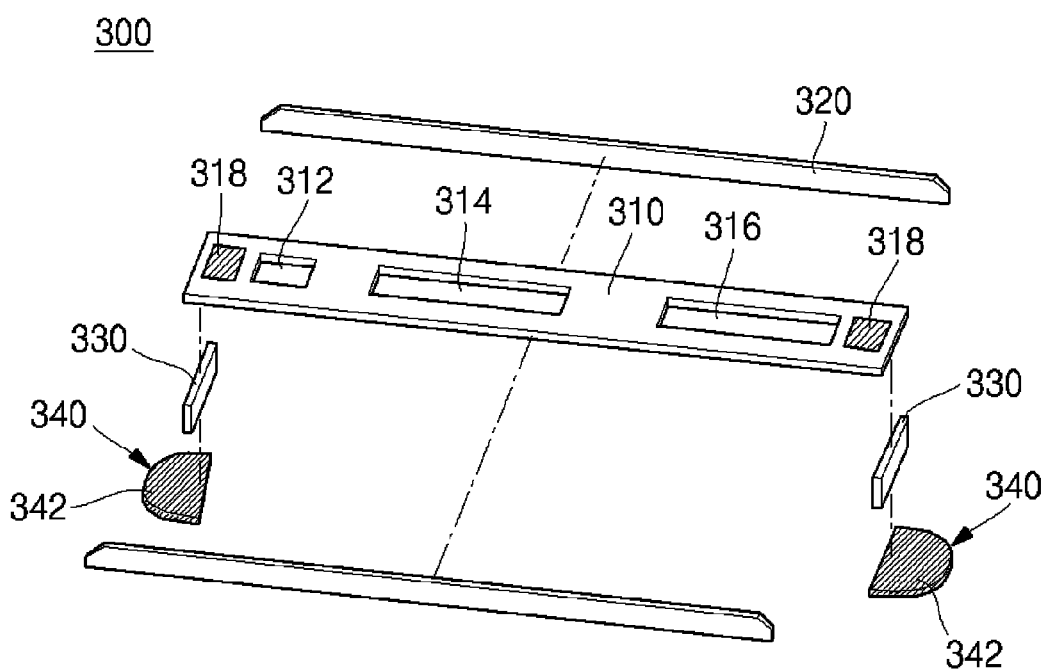

FIG. 1 is an exploded perspective view of a secondary battery 1000 according to an aspect of the invention, and FIGS. 2A and 2B show a module frame 300 of the secondary battery 1000 according to an aspect of the invention. Referring to FIG. 1, the secondary battery 1000 includes a bare cell 100, a protection circuit module 200, and the module frame 300. The bare cell 100 includes an electrode assembly 110, a can 120, an insulating case 130, and a cap assembly 140. The can 120 has an opening 122 into which the electrode assembly is inserted.

The electrode assembly 110 includes a first electrode 111, a second electrode 112, a separator 113 disposed between the first electrode 111 and the second electrode 112 and insulating the first electrode 111 from the second electrode 112, a first electrode tab 114 connected to the first electrode 111, and a second electrode tab 115 connected to the second electrode 112.

The electrode assembly 110 shown in FIG. 1 is of a jelly-roll type in which the first electrode 111, the separator 113, and the second electrode 112 are sequentially stacked and wound in a jelly-roll configuration. Although not shown, the electrode assembly 110 may be of a stack-type in which the first electrode, the separator, the second electrode, and the separator are repeatedly stacked, or a fold-type in which the first electrode, the separator, and the second electrode are folded in a zigzag form.

The insulating case 130 insulates the cap assembly 140 from the electrode assembly 110. The insulating case 130 includes a through-hole 132 through which the first electrode tab 114 extends, and a cut-out 134 through which the second electrode tab 115 extends.

The cap assembly 140 includes an electrode terminal 141 and a cap plate 142. The cap plate 142 seals the opening 122 of the can 120. The electrode terminal 141 is electrically connected to the first electrode tab 114 at a predetermined position of the cap plate 142, and the cap plate 142 is insulated from the electrode terminal 141 by a gasket 143 that serves as an insulator. Although not shown, the cap assembly 140 may instead include a terminal plate (not shown) electrically connected to the electrode terminal 141, and an insulating plate (not shown) that insulates the terminal plate from the cap plate 142. The cap plate 142 is electrically connected to the second electrode tab 115 at a predetermined position of the cap plate 142.

The cap plate 142 includes an electrolyte injection hole 144 corresponding to an electrolyte inlet 136 of the insulating case 130. When injecting of an electrolyte through the electrolyte injection hole 144 is completed, the electrolyte injection hole 144 is closed using a plug 145 and the can 120 is then hermetically sealed.

The protection circuit module 200 is provided on one side of the bare cell 100, specifically on the cap plate 142. The protection circuit module 200 includes a control device 210, such as an integrated circuit (IC) device, mounted on the bottom surface of the protection circuit module 200 facing a top surface of the cap plate 142. The protection circuit module 200 also includes external terminals 220 provided on its top surface opposite to the bottom surface having the control device 210 mounted thereon, the external terminals 220 connecting the secondary battery 1000 to an external device.

The protection circuit module 200 includes a terminal through-hole 230. The terminal through-hole 230 is used to weld a second terminal 244 of a secondary protection device 240 to the electrode terminal 141. That is, the terminal through-hole 230 is provided to permit a laser beam for laser welding, or a rod for resistance welding, to pass through to reach the second terminal 244 when the second terminal 244 is welded to the electrode terminal 141 by laser welding or resistance welding. The term "a secondary protection device" used herein is intended to distinguish this protection device from a primary protection device, such as a safety vent (not shown) installed in the bare cell 100.

To prevent an overcurrent from flowing in the secondary battery 1000, the secondary battery 1000 includes the secondary protection device 240. The secondary protection device 240 is provided between the electrode terminal 141 and the protection circuit module 200. The secondary protection device 240 includes a first terminal 242, a second terminal 244, and a positive temperature coefficient (PTC) device 246. Suitable PTC devices are well known in the art, and thus specific examples are not provided herein. The first terminal 242 is connected to the protection circuit module 200, and the second terminal 244 is connected to the electrode terminal 141.

The module frame 300 is provided between the protection circuit module 200 and the top surface of the cap plate 142 of the bare cell 100, and functions to mount the protection circuit module 200 on the top surface of the cap plate 142 in a stable manner and to establish a stable electrical connection between the protection circuit module 200 and the cap plate 142. The module frame 300 is mounted on the cap plate 142. Specifically, the module frame 300 is mounted so that frame supporting portions 340 of the module frame 300, which will be described below with reference to FIGS. 2A and 2B, are fastened to the cap plate 142.

The frame supporting portions 340 and the cap plate 142 may be fastened to each other by fastening members, such as bolts, or by welding, such as laser welding or resistance welding. However, it is understood that other methods of fastening may be used.

The module frame 300 may be made of a conductive material, preferably one or more of nickel, aluminum, and a nickel-silver composite.

The module frame 300 will now be described in more detail with reference to FIGS. 2A and 2B. The module frame 300 includes a bottom portion 310, wing portions 320, frame connecting portions 330, and frame supporting portions 340. FIG. 2B is an exploded view showing various parts of the module frame 300, which is provided for a better understanding of a configuration of the module frame 300, but is not intended to indicate that the module frame 300 is actually broken down into those parts. That is, rather than being assembled from the individual parts shown in FIG. 2B, the module frame 300 may be fabricated, for example, by stamping and bending a single piece of metal to have the configuration shown in FIG. 2B. However, it is understood that other methods may be used to fabricate the module frame 300.

The bottom portion 310 has a rectangular shape. The bottom portion 310 contacts the bottom surface of the protection circuit module 200 to support the protection circuit module 200. The bottom portion 310 includes one or more open regions 312, 314, and 316 at predetermined positions thereof.

FIGS. 2A and 2B show three open regions, that is, the open regions 312, 314, and 316. The open regions 312, 314, and 316 may be a first open region 312 for the secondary protection device 240, a second open region 314 for the secondary protection device 240, and an open region 316 for the control device 210.

The first and second open regions 312 and 314 for the secondary protection device 240 are used for connecting the first terminal 242 of the secondary protection device 240 to the protection circuit module 200 and for connecting the second terminal 244 of the secondary protection device 240 to the electrode terminal 141, respectively.

The first open region 312 for the secondary protection device 240 is provided to allow the protection circuit module 200 to be mounted on the module frame 300 and to connect the first terminal 242 of the secondary protection device 240 to the protection circuit module 200.

The second open region 314 for the secondary protection device 240 is used together with the terminal through-hole 230 of the protection circuit module 200 when the second terminal 244 of the secondary protection device 240 and the electrode terminal 141 are subjected to laser welding or resistance welding. That is, the laser beam for laser welding or the rod for resistance welding irradiates or reaches a surface of the second terminal 244 through the terminal through-hole 230 and the second open region 314 for the secondary protection device 240 to weld the second terminal 244 to the electrode terminal 141.

When the control device 210 is provided on the bottom surface of the protection circuit module 200 facing the top surface of the cap plate 142 as shown in FIG. 1, the open region 316 for the control device 210 allows the control device 210 to protrude toward the top surface of the cap plate 142 without contacting the bottom portion 310 of the module frame 300.

The bottom portion 310 includes at least one first contact surface 318 electrically contacting the protection circuit module 200 at a predetermined position thereof, preferably at a predetermined position at either end of the bottom portion 310.

All regions of the bottom portion 310 are coated with an insulating film except for the first contact surface 318. That is, when the protection circuit module 200 is mounted in the module frame 300, all the regions of the bottom portion 310, except for the first contact surface 318 where the protection circuit module 200 and the module frame 300 are electrically connected to each other, are coated with an insulating film. This prevents the protection circuit module 200 and the module frame 300 made of a conductive material from unnecessarily being electrically connected to each other.

The wing portions 320 extend in an upward direction from both lateral edges of the bottom portion 310. The combination of the bottom portion 310 and the wing portions 320 has a U-shaped vertical cross-section that provides a space to accommodate the protection circuit module 200. The wing portions 320 support lateral surfaces of the protection circuit module 200 and prevent the protection circuit module 200 from moving in a lateral direction. Surfaces of the wing portions 320, particularly surfaces in contact with the protection circuit module 200, are coated with an insulating film.

The frame connecting portions 330 extend in a downward direction from opposite ends of the bottom portion 310, that is, toward the cap plate 142, which is opposite to the direction in which the wing portions 320 extend. The frame connecting portions 330 space the bottom portion 310 of the module frame 300 from the cap plate 142 by a predetermined gap, thereby providing a space to accommodate a device such as the secondary protection device 240 between the cap plate 142 and the bottom portion 310. Like the wing portions 320, surfaces of the frame connecting portions 330 are coated with an insulating film.

The frame supporting portions 340 extend from respective ones of the frame connecting portions 330 and are parallel with the bottom portion 310. The frame supporting portions 340 support the module frame 300 and are fastened to cap plate 142 to fasten the module frame 300 to the bare cell 100. As described above, the frame supporting portions 340 may be fastened to the cap plate 142 using bolts, or using welding such as resistance welding or laser welding.

Since the frame supporting portions 340 are electrically connected to the cap plate 142, the frame supporting portions 340 become second contact portions 342 where the frame supporting portions 340 are electrically connected to the cap plate 142. Accordingly, the frame supporting portions 340 are not coated with an insulating film, unlike the bottom portion 310 and the wing portions 320.

Figure 3:
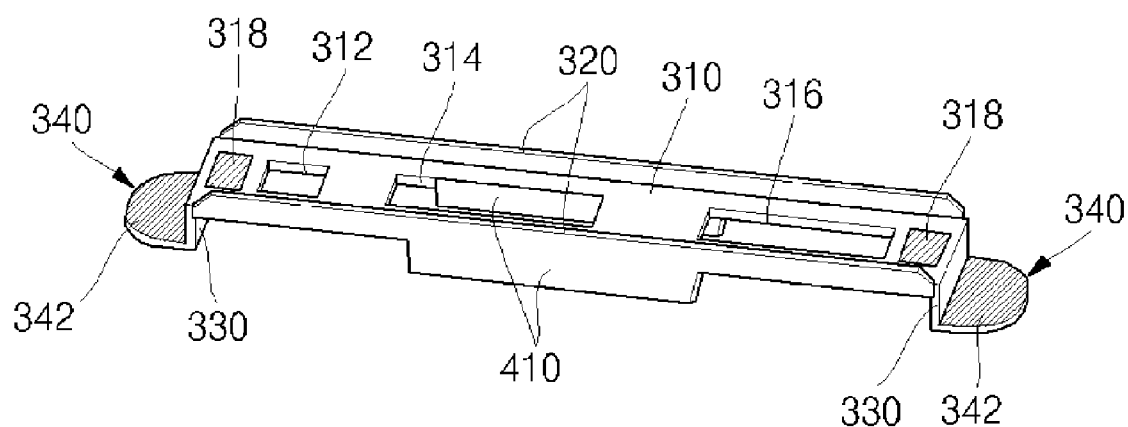
FIG. 3 show a module frame of a secondary battery according to an aspect of the invention.

FIG. 3 shows a module frame 300a of a secondary battery according to an aspect of the invention. Although the module frame 300a as a component of the secondary battery 1000 shown in FIG. 1 is shown in FIG. 3 by way of example, the invention is not limited thereto. For simplicity, the other component members of the secondary battery 1000 shown in FIG. 1, i.e., the bare cell 100, the protection circuit module 200, and the secondary protection device 240, are not shown in FIG. 3.

Compared to the module frame 300 shown in FIGS. 1, 2A, and 2B, the module frame 300a in FIG. 3 further includes intermediate support portions 410. The intermediate support portions 410 extend from the bottom portion 310 or the wing portions 320 of the module frame 300a toward the top surface of the cap plate 142, which is opposite to a direction in which the wing portions 320 extend. The intermediate support portions 410 extend so that they contact the cap plate 142, thereby supporting a central portion of the module frame 300a.

That is, opposite ends of the module frame 300a are supported by the frame connecting portions 330 and the frame supporting portions 340 extending from both ends of the bottom portion 310, while the central portion of the module frame 300a is supported by the intermediate support portions 410.

Figure 4:
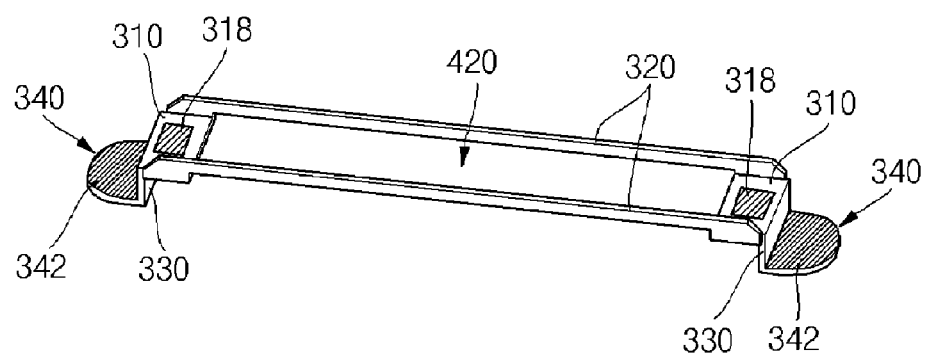
FIG. 4 show a module frame of a secondary battery according to an aspect of the invention.

FIG. 4 shows a module frame 300b of a secondary battery according to an aspect of the invention. Although the module frame 300b as a component of the secondary battery 1000 shown in FIG. 1 is shown in FIG. 4 by way of example, the invention is not limited thereto. For simplicity, the other component members of the secondary battery 1000 shown in FIG. 1, i.e., the bare cell 100, the protection circuit module 200, and the secondary protection device 240, are not shown in FIG. 4.

The module frame 300b has a single open region 420 formed in the bottom portion 310. The single open region 420 combines the first and second open regions 312 and 314 for the secondary protection device 240 and the open region 316 for the control device 210 shown in FIGS. 1, 2A, 2B, and 3.

An electrical connection between the protection circuit module 200 and the module frame 300 is made on the first contact surface 318 and the bottom portion 310 in the vicinity of the first contact surface 318.

Figure 5:
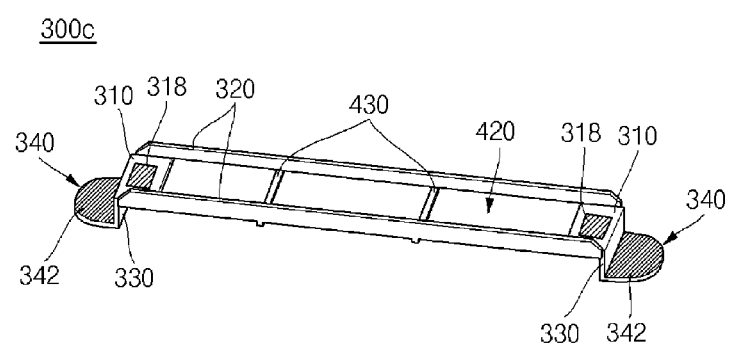
FIG. 5 show a module frame of a secondary battery according to an aspect of the invention.

FIG. 5 shows a module frame 300c of a secondary battery according to an aspect of the invention. Although the module frame 300c as a component of the secondary battery 1000 shown in FIG. 1 is shown in FIG. 5 by way of example, the invention is not limited thereto. For simplicity, the other component members of the secondary battery 1000 shown in FIG. 1, i.e., the bare cell 100, the protection circuit module 200, and the secondary protection device 240, are not shown in FIG. 5.

The module frame 300c includes ribs 430 provided in the single open region 420. Opposite ends of each of the ribs 430 are connected to respective ones of the wing portions 320 so that the ribs 430 extend across the single open region 420.

The ribs 430 support the protection circuit module 200 to prevent the protection circuit module 200 from sagging downward at the single open region 420. Since most of the bottom portion 310 is occupied by the single open region 420 as shown in FIG. 5, the protection circuit module 200 cannot be supported by the wing portions 320 alone, and is liable to sag downward. Such a downward sagging phenomenon can be prevented by the ribs 430.

Although FIG. 5 shows the ribs 430 being provided in the single open region 420, the invention is not limited thereto, and the ribs 430 may also be provided in the first and second open regions 312 and 314 for the secondary protection device 240 and the open region 316 for the control device 210 shown in FIGS. 1, 2A, 2B, and 3.

Although several embodiments of the invention have been shown and described, it will be appreciated by those skilled in the art that changes may made be made in these embodiments without departing from the principles and spirit of the invention, the scope of which is defined by the claims and their equivalents.

What is claimed is:

1. A secondary battery comprising:
a bare cell comprising a cap plate;
a protection circuit module; and
a module frame provided between the cap plate and the protection circuit module to support the protection circuit module, wherein the module frame comprises a conductive material to electrically connect the cap plate and the protection circuit module to each other, wherein the module frame comprises integrated first and second distinct supporting portions, wherein each supporting portion is fastened to the cap plate and each supporting portion is also connected to the remainder of the module frame such that each supporting portion is configured to provide an electrical path between the cap plate and the module frame,
wherein the module frame comprises an insulating film coating all regions of the module frame except for contact regions to establish electrical connections with the cap plate and the protection circuit module, and
wherein the module frame comprises:
a rectangular bottom portion;
a pair of wing portions extending from both lateral edges of the bottom portion in a first direction away from the cap plate; and
a pair of frame connecting portions extending from opposite ends of the bottom portion in a second direction toward the cap plate,
wherein the frame supporting portions extend from respective ones of the frame connecting portions parallel with the bottom portion.

2. The secondary battery of claim 1, wherein the bare cell further comprises: an electrode assembly comprising a first electrode, a second electrode, and a separator disposed between the first electrode and the second electrode to insulate the first electrode from the second electrode; a can having an opening to accommodate the electrode assembly; and an electrode terminal electrically connected to the first electrode; wherein the cap plate seals the opening of the can, is insulated from the electrode terminal, and is electrically connected to the second electrode.

3. The secondary battery of claim 1, wherein the module frame comprises one or more of nickel, aluminum, and a nickel-silver composite.

4. The secondary battery of claim 1, wherein the bottom portion of the module frame has an open region.

5. The secondary battery of claim 4, further comprising a secondary protection device comprising a first terminal, a second terminal, and a positive temperature coefficient (PTC) device; wherein the open region is a first open region for the secondary protection device and enables the first terminal of the secondary protection device and the protection circuit module to be connected to each other.

6. The secondary battery of claim 5, further comprising a secondary protection device including a first terminal, a second terminal, and a positive temperature coefficient (PTC) device; wherein the bare cell further comprises an electrode terminal supported by the cap plate; and wherein the open region is a second open region for the secondary protection device and enables the second terminal of the secondary protection device and the electrode terminal to be connected to each other.

7. The secondary battery of claim 4, wherein the protection circuit module comprises: a control device mounted on a first surface of the protection circuit module facing toward the cap plate; and an external terminal provided on a second surface of the protection circuit module facing away from the cap plate to connect the secondary battery to an external device; wherein the open region is an open region for the control device to accommodate the control device mounted on the first surface of the protection circuit module.

8. The secondary battery of claim 4, wherein the module frame further comprises at least one rib extending across the open region; and wherein opposite ends of each of the at least one rib are connected to respective ones of the wing portions so that each of the at least one rib extends across the open region to support the protection circuit module.

9. The secondary battery of claim 4, further comprising:
a secondary protection device comprising a first terminal, a second terminal, and a positive temperature coefficient (PTC) device,
wherein the bare cell further comprises an electrode terminal supported by the cap plate,
wherein the protection circuit module comprises:
- a control device mounted on a first surface of the protection circuit module facing toward the cap plate, and
- an external terminal provided on a second surface of the protection circuit module facing away from the cap plate to connect the secondary battery to an external device, and wherein the open region comprises:
- a first open region for the secondary protection device that enables the first terminal of the secondary protection device and the protection circuit module to be connected to each other,
- a second open region for the secondary protection device that enables the second terminal of the secondary protection device and the electrode terminal to be connected to each other, and
- an open region for the control device to accommodate the control device mounted on the first surface of the protection circuit module.

10. The secondary battery of claim 1, wherein the module frame further comprises intermediate support portions extending from the bottom portion or the wing portions toward the cap plate to support the module frame.

11. The secondary battery of claim 1, wherein the frame supporting portions are bolted or welded to the cap plate.

12. The secondary battery of claim 11, wherein the frame supporting portions are laser-welded or resistance-welded to the cap plate.

13. A secondary battery comprising:
a bare cell comprising a cap plate;
a module frame mounted on the cap plate; and
a protection circuit module supported by the module frame,
wherein the module frame is electrically conductive so that the cap plate and the protection circuit module are electrically connected to each other via the module frame,
wherein the module frame comprises integrated first and second distinct supporting portions, wherein each supporting portion is fastened to the cap plate and each supporting portion is also connected to the remainder of the module frame such that each supporting portion is configured to provide an electrical path between the cap plate and the module frame,
wherein the module frame comprises an insulating film entirely coating the module frame except for contact regions where the module frame is electrically connected to the cap plate and the protection circuit module, and
wherein the module frame comprises:
- a rectangular plate having at least one open region;
- a pair of wing portions extending from both lateral edges of the rectangular plate in a first direction away from the cap plate; and
- a pair of frame connecting portions extending from opposite ends of the rectangular plate in a second direction toward the cap plate,
wherein the frame supporting portions extend from respective ones of the frame connecting portions parallel with the bottom portion.

14. The secondary battery of claim 13, further comprising a secondary protection device disposed between the cap plate and the module frame; wherein: the bare cell further comprises an electrode terminal supported by the cap plate; the secondary protection device comprises a first terminal connected to the protection circuit, and a second terminal connected to the electrode terminal; and the module frame has at least one open region that enables the first terminal of the secondary protection device to be connected to the protection circuit module during assembly of the secondary battery, and enables the second terminal of the secondary protection device to be connected to the electrode terminal of the bare cell during assembly of the secondary battery.

15. The secondary battery of claim 13, wherein the protection circuit module comprises a control device mounted on a surface of the protection circuit module facing the cap plate, and wherein the module frame has an open region through which the control device extends toward the cap plate.

16. The secondary battery of claim 13, wherein the rectangular plate supports the protection circuit module; and the wing portions prevent the protection circuit module from moving in a lateral direction.

* * * * *